(12) United States Patent
Mourik et al.

(10) Patent No.: US 6,615,936 B1
(45) Date of Patent: Sep. 9, 2003

(54) METHOD FOR APPLYING HARDFACING TO A SUBSTRATE AND ITS APPLICATION TO CONSTRUCTION OF MILLED TOOTH DRILL BITS

(75) Inventors: Nephi M. Mourik, The Woodlands, TX (US); J. Albert Sue, The Woodlands, TX (US); Alysia C. White, Fulshear, TX (US)

(73) Assignee: Smith International, Inc., Houston, TX (US)

( * ) Notice: Subject to any disclaimer, the term of this patent is extended or adjusted under 35 U.S.C. 154(b) by 0 days.

(21) Appl. No.: 09/552,534

(22) Filed: Apr. 19, 2000

(51) Int. Cl.$^7$ ................................................ E21B 10/00
(52) U.S. Cl. ........................................ 175/426; 175/374
(58) Field of Search ................................. 175/374, 426, 175/428, 435; 76/108.2

(56) References Cited

U.S. PATENT DOCUMENTS

| | | | |
|---|---|---|---|
| 4,726,432 A | 2/1988 | Scott et al. | 175/375 |
| 4,836,307 A | 6/1989 | Keshavan et al. | 175/374 |
| 4,940,099 A * | 7/1990 | Deane et al. | 175/374 |
| 5,051,112 A | 9/1991 | Keshavan et al. | 51/309 |
| 5,152,194 A * | 10/1992 | Keshavan et al. | 76/108.2 |
| 5,351,769 A | 10/1994 | Scott et al. | 175/374 |
| 5,351,771 A | 10/1994 | Zahradnik | 175/374 |
| 5,445,231 A | 8/1995 | Scott et al. | 175/374 |
| 5,492,186 A | 2/1996 | Overstreet et al. | 175/374 |
| 5,791,423 A | 8/1998 | Overstreet et al. | 175/375 |
| 6,124,564 A * | 9/2000 | Sue et al. | 219/121.47 |
| 6,196,338 B1 * | 3/2001 | Slaughter et al. | 175/331 |
| 6,206,115 B1 * | 3/2001 | Overstreet et al. | 175/374 |
| 6,374,704 B1 * | 4/2002 | Scott et al. | 76/108.2 |

FOREIGN PATENT DOCUMENTS

| | | |
|---|---|---|
| EP | 0 257 869 A2 | 3/1988 |
| EP | 0 467 870 A1 | 1/1992 |
| GB | 2 333 482 | 7/1999 |
| GB | 2 334 278 | 8/1999 |

OTHER PUBLICATIONS

United Kingdom Search Report dated Jul. 9, 2001.

* cited by examiner

Primary Examiner—David Bagnell
Assistant Examiner—Jennifer R. Dougherty
(74) Attorney, Agent, or Firm—Rosenthal & Osha L.L.P.

(57) ABSTRACT

A method for applying hardfacing to teeth on a drill bit is disclosed. The method includes applying the hardfacing to at least one of the teeth so as to have a thickness selected to correspond to a position about exterior surface of the tooth. In one embodiment, the hardfacing thickness is increased near the crest of the tooth, and is decreased near the root of the tooth on at least one flank of the tooth. In one embodiment, the thickness is selected by controlling the powder flow rate in a plasma transferred arc welding system. In another embodiment an angle subtended by flanks of the tooth is selected to provide increased strength to the tooth, and the hardfacing is applied to the tooth to cause exterior surfaces of the hardfacing corresponding to the flanks to subtend an angle selected to provide increased penetration of the tooth through earth formations while drilling.

36 Claims, 8 Drawing Sheets

*(Pror Art)*

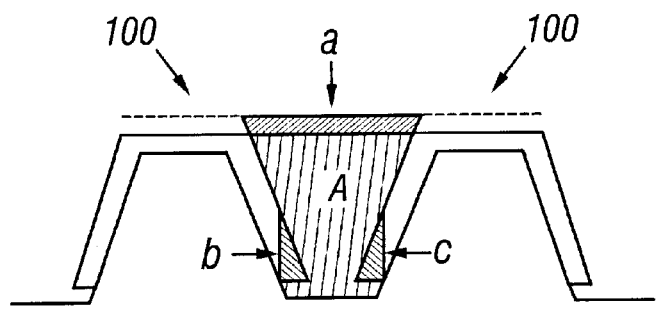
FIG. 6
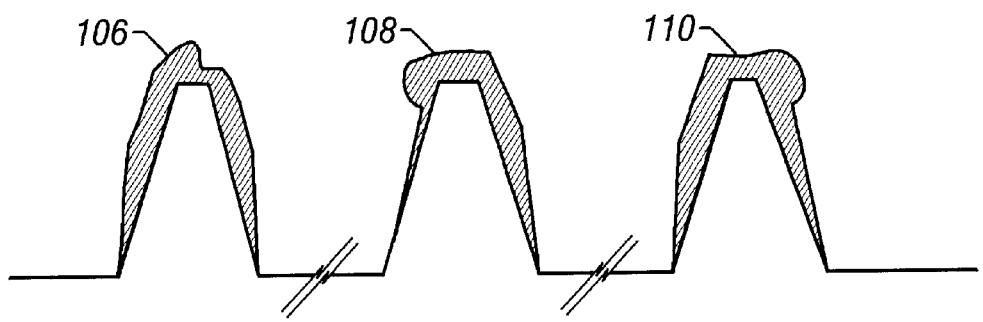
FIG. 7　　FIG. 8　　FIG. 9

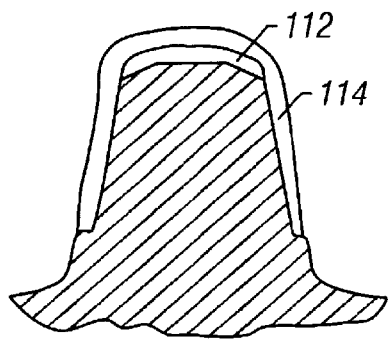
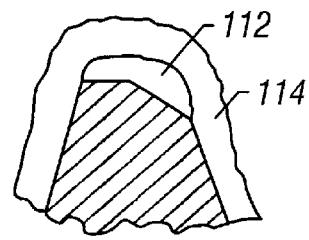
FIG. 10    FIG. 11
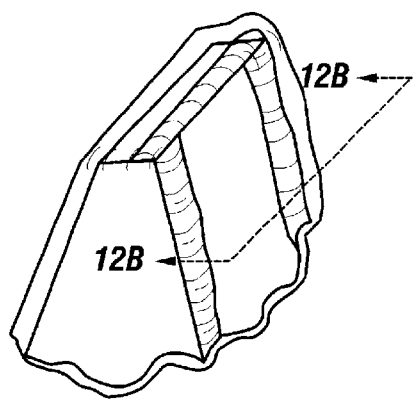
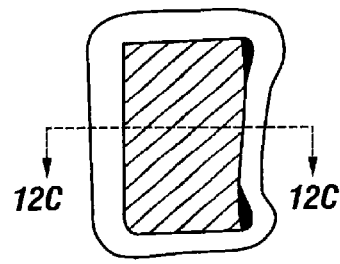
FIG. 12A    FIG. 12B
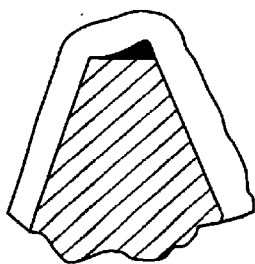
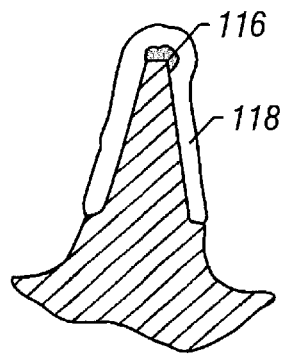
FIG. 12C    FIG. 13

METHOD FOR APPLYING HARDFACING TO A SUBSTRATE AND ITS APPLICATION TO CONSTRUCTION OF MILLED TOOTH DRILL BITS

BACKGROUND OF THE INVENTION

1. Field of the Invention

This invention relates to hardfacing coatings on a metallic work piece, and more particularly to deposition of a hardfacing coating on roller cone surfaces of a rock bit in selected patterns and thicknesses.

2. Description of the Related Art

Earth boring devices, such as rock bits used in petroleum and rock drilling applications, include surfaces exposed to erosive wear due to contact with geological formations. Two types of rock bits are commonly used: tungsten carbide insert rock bits and milled tooth rock bits.

Tungsten carbide insert rock bits are generally used to drill hard formations because of the enhanced ability of tungsten carbide inserts to penetrate hard formations. However, the tungsten carbide inserts are mounted in a relatively soft metal, such as steel, that forms the body of the cutter cone. The relatively soft metal cutter body which holds the inserts in place may be abraded or eroded away when subjected to a high abrasive drilling environment. This abrasion or erosion occurs primarily due to the presence of cuttings from the formation, the direct blasting effect of the drilling fluid utilized in the drilling process, and the rolling and sliding contact of the cone body or cone shell with the formation. When the material supporting the inserts is eroded or abraded away to a substantial extent, the drilling forces being exerted on the inserts may either break the inserts or force them out of the cutter cone when they engage the formation. As a result, the bit may no longer be effective in cutting the formation. Moreover, the loose inserts that break off from the cutter cone may damage other inserts and the cutter cone, and eventually may lead to failure of the cutter cone.

When drilling relatively soft but abrasive formations, individual cutting inserts may penetrate entirely into the abrasive formation, causing the formation to come into contact with the cutter cone. When this contact occurs, the relatively soft cone shell material will erode away, namely at the edges of the surface lands, until the previously embedded portion of the insert becomes exposed and the retention ability in the cone shell is reduced, which may result in the loss of the insert and reduction of the life of the bit. To protect the cutter cone from erosion, hardfacing material, such as tungsten carbide, has been applied to the cone surfaces by a variety of well known methods.

Milled tooth rock bits are another important type of rock bits used in petroleum and mining drilling applications. A milled tooth bit has a roller cone with teeth protruding from the surface of the cone for engaging the rock. The teeth are made of hardened steel and generally are triangular in a cross-section (as observed in a plane perpendicular to the axis of the cone). The principal faces of the milled teeth that engage the rock usually are dressed with a layer of hardfacing material to increase wear-resistance.

Different methods have been developed, with varying degree of success, for applying hardface coatings to various wear prone surfaces on rock bits. For example, to prevent erosion, small, flat-top compacts made of hard material may be placed in vulnerable cone areas using a silicate bonding agent. Wear resistant material can be applied to exposed surfaces of a cutter cone by thermal spraying, plasma arc welding, or other conventional welding.

Milled tooth rock bits present a particular problem in applying hardfacing material in such a way as to most effectively lengthen the overall useful life of the bit. For example, various hardface material compositions and particle size distributions are disclosed in U.S. Pat. No. 4,836,307 issued to Keshavan et al, U.S. Pat. No. 5,051,112 issued to Keshavan et al, and U.S. Pat. No. 5,492,186 issued to Overstreet et al which discloses a bimetallic hardface gauge facing. Others have disclosed, for example, applying an additional layer of hardfacing on one flank of the milled teeth to improve the wear resistance of the teeth. See for example, U.S. Pat. No. 5,791,423 issued to Overstreet et al. An additional layer of hardfacing is typically applied by passing the teeth a second time through the apparatus used to apply the hardfacing. Still others have disclosed various shapes for the teeth formed so that when a relatively uniform thickness layer of hardfacing material is applied thereto, the result is improved wear resistance. See for example, U.S. Pat. No. 5,445,231 issued to Scott et al wherein a tooth substrate is shaped so that a hardface applied therein which has a uniform external surface provides hardface having greater thickness on one tooth flank than on the other. U.S. Pat. No. 5,351,771 issued to Zahradnik shows a bit tooth crest having indentations where the crest contacts the edges of the flanks to provide thicker hardface in such locations when hardface is applied so as to have a uniform external surface. U.S. Pat. No. 5,351,769 issued to Scott et al shows the crests of the teeth milled to have a recess on one side thereof for application of hardface material.

FIG. 1, for example, shows one type of prior art hardface application to the teeth on a drill bit. The teeth, shown generally at 10 include thereon a hardface coating 12 upon a tooth substrate 14. The hardface 12 has a first, substantially constant thickness $t_1$ along one flank, such as the trailing edge flank, and a different substantially constant thickness $t_2$ along the other flank of each substrate 14. As previously explained, the greater thickness can be obtained by a second pass through the application system (such as welding). In any event, the teeth shown in FIG. 1 have substantially constant thickness of hardfacing on each flank thereof.

FIG. 2 illustrates typical manual application of hardfacing using a manual welding apparatus such as a torch 38 and welding rods 39. The heat 37 from the torch 38 melts the rods 39 whereupon the material is fusibly bonded to the substrate 25. There is no provision in this technique for selecting different hardfacing thickness between the flanks 27, 29 crest 31 and sides 33, 35 of the substrate 25.

Illustrations of specialized shapes for the substrates are shown in FIGS. 3 and 4, wherein a substantially uniform thickness hardfacing is applied to the shapes shown in FIGS. 3 and 4 to result in bit teeth having selected wearing characteristics. The specialized shapes such as shown at 237 in FIG. 4 and 137 in FIG. 3 can have the undesired side effect of creating stress risers in the substrates 225 and 125 respectively.

The hardfacing application techniques known in the art can provide improved resistance to wear of the teeth but may have the unintended side effect of reducing bit performance by reducing debris clearance between adjacent teeth, as well as increasing residual stresses in the teeth where specialized tooth structures are used.

SUMMARY OF THE INVENTION

One aspect of the invention is a method for applying hardfacing to teeth on a drill bit. The method includes applying the hardfacing to the teeth so as to have a thickness selected to correspond to the position along the surface of the tooth.

In one embodiment of the method of the invention, the hardfacing thickness is increased near the crest of at least one tooth, and is decreased near the flank root of at least one flank of that at least one tooth.

In another embodiment of the method, the hardfacing is applied so as to have a thickness which results in the formation of a self-sharpening cap proximal to the crest of at least one tooth.

In another embodiment of the method, an angle subtended by flanks of the tooth is selected to provide increased strength to the tooth, and the hardfacing is applied to the tooth to cause exterior surfaces of the hardfacing corresponding to the flanks to subtend an angle selected to provide increased penetration of the tooth through earth formations while drilling.

In another embodiment of the method, the hardfacing is applied to a greater thickness on a leading edge of the tooth than on the trailing edge of the tooth.

Another aspect of the invention is a drill bit cutting element. The cutting element includes a substrate, and a hardface overlay applied to an exterior of the substrate so that a thickness of the hardface overlay is selected to correspond to a position about the exterior surface of the substrate.

In one embodiment of the cutting element, the hardfacing thickness is increased near the crest of the cutting element, and is decreased near the flank root of at least one flank of the cutting element.

In another embodiment of the cutting element, the hardfacing is applied so as to have a thickness which results in a self-sharpening cap proximal to the crest of the cutting element.

In another embodiment of the cutting element, an angle subtended by flanks of the cutting element substrate is selected to provide increased strength to the cutting element, and the hardfacing is applied to the substrate to cause exterior surfaces of the hardfacing corresponding to the flanks to subtend an angle selected to provide increased penetration of the cutting elements through earth formations while drilling.

In another embodiment of the cutting element, the hardfacing is applied to a greater thickness on a leading edge of the cutting element than on a trailing edge of the cutting element.

BRIEF DESCRIPTION OF THE DRAWINGS

FIG. 6 shows how tapered hardface material can increase debris clearance between adjacent teeth.

FIGS. 7 through 9 show examples of self-sharpening bit teeth made according to another embodiment of the invention.

FIGS. 10 through 17 show examples of multiple layers of hardfacing applied to a substrate to compensate for wear of the substrate.

DETAILED DESCRIPTION

Figure 1:
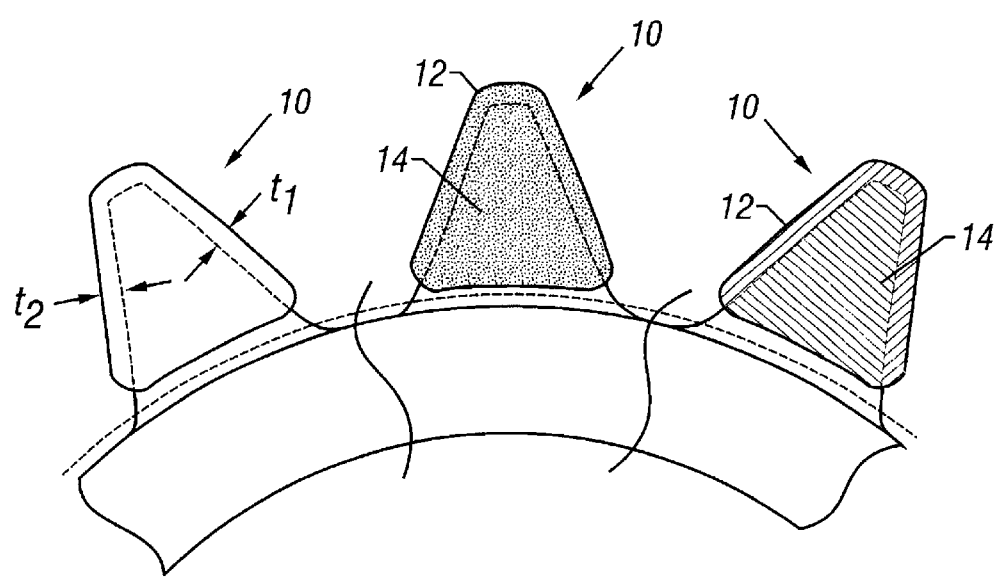
FIGS. 1 through 4 show examples of prior art hardface coatings on drill bit teeth and specialized shapes for such teeth.
Figure 2:
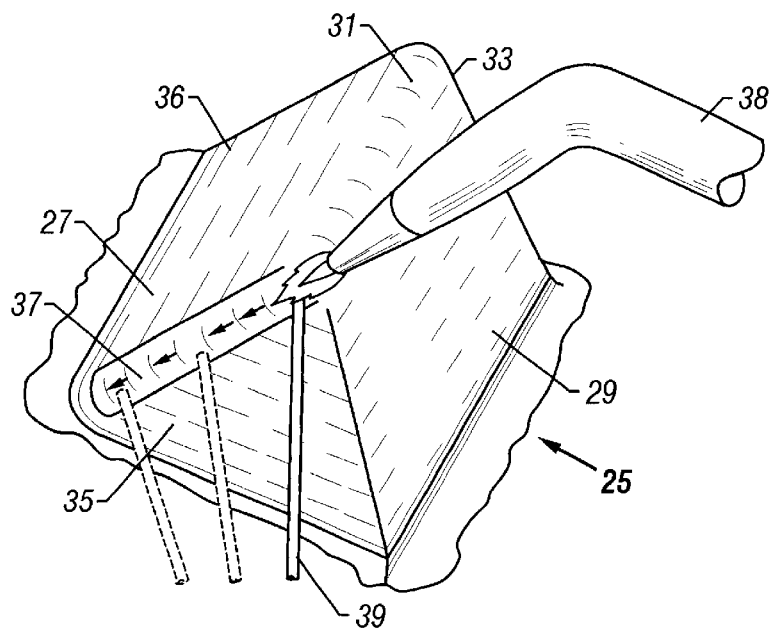
Figure 3:
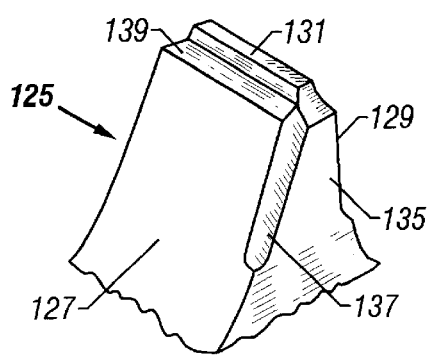
Figure 4:
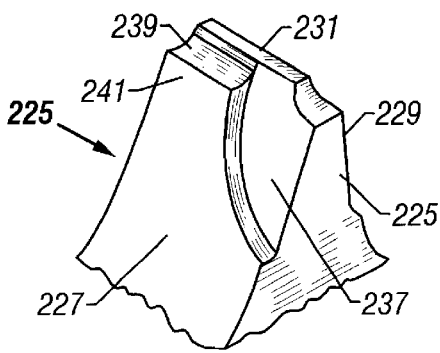
Figure 5:
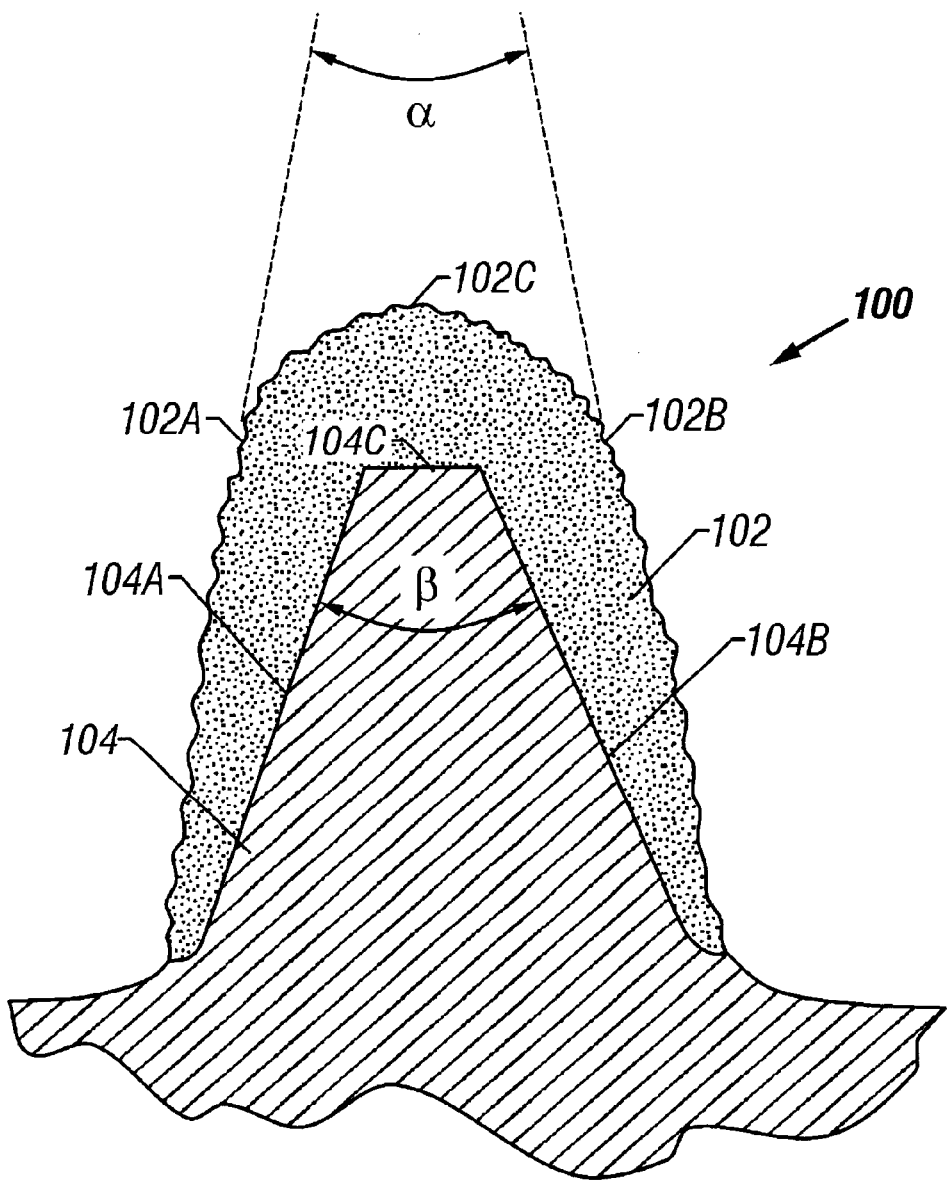
FIG. 5 shows one example of a hardface material applied to a drill bit tooth according to the invention.
Figure 14:
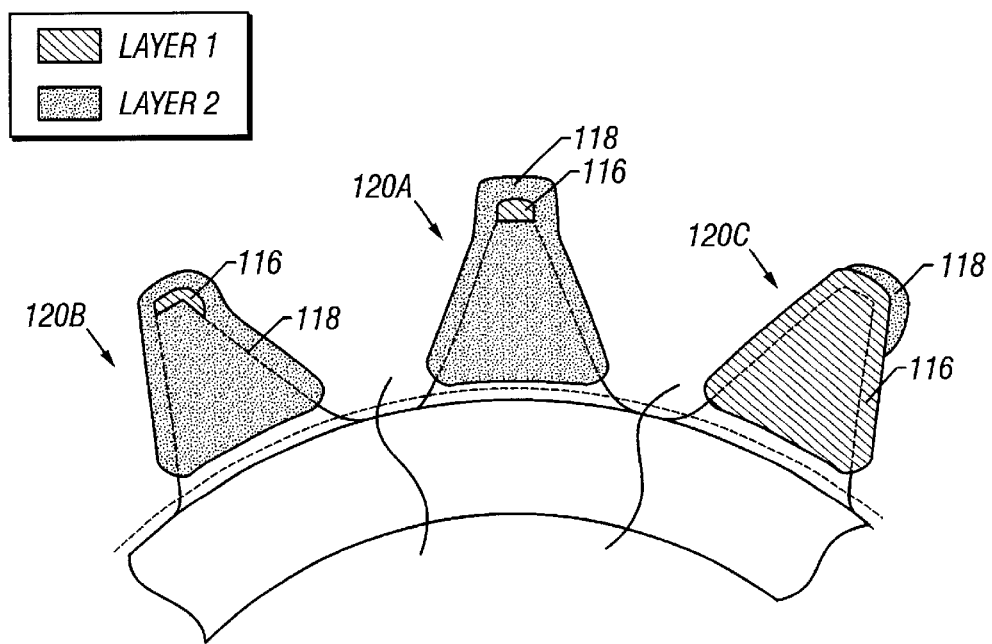
Figure 15:
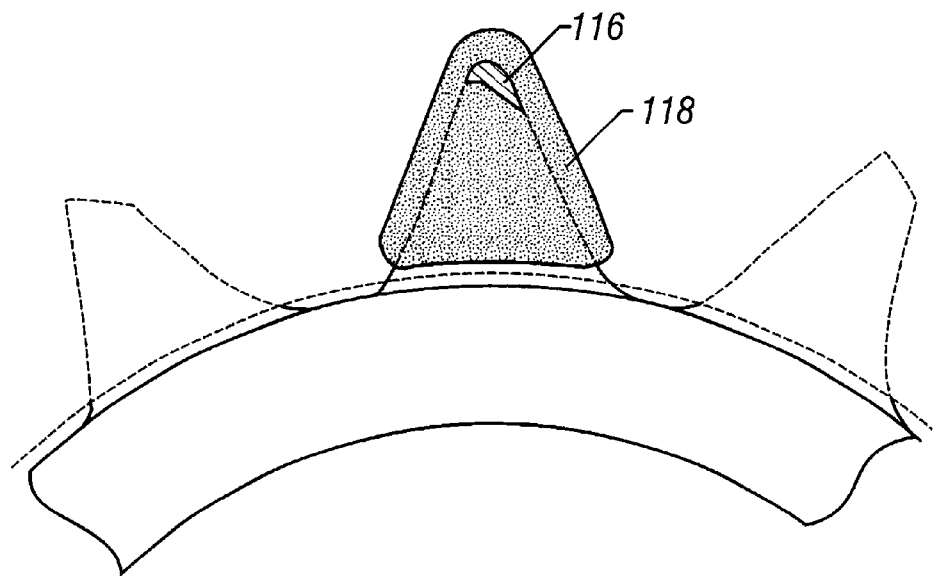
Figure 16:
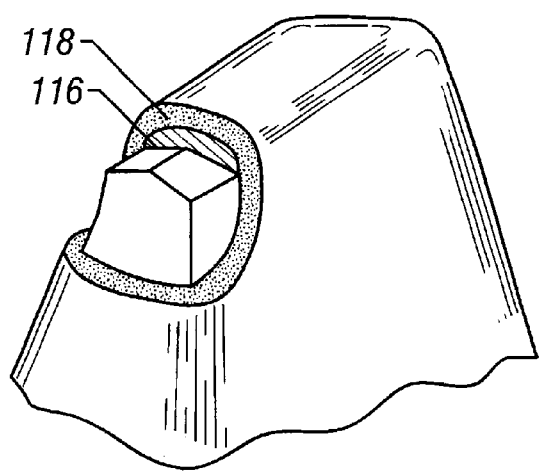

FIG. 5 shows one example of a drill bit tooth 100 such as a milled tooth forming part of a typical roller cone (not shown) on a roller cone bit. The tooth 100 in this example is a composite structure consisting of a tooth substrate 104 and a hardface overlay 102. The tooth substrate 104 can be made from steel or similar structural material used to make up the roller cone (not shown) by any process well known in the art. The tooth substrate 104 in this example includes thereon a leading flank 104A, a crest 104C and a trailing flank 104B. The leading 104A and trailing 104B flanks in this example subtend an angle, β, which can be selected to provide the tooth substrate 104 with improved, or even optimal strength properties under the axial and transverse loading expected on the typical milled tooth drill bit. Such angles are frequently in the range of about 35–55 degrees. The flanks 104A and 104B may or may not be symmetrically oriented (or subtend the same angle) with respect to the center of the tooth substrate 104.

The tooth substrate 104 has applied to its exterior surface the hardface overlay 102. The hardface overlay 102 is generally made from material having substantially more hardness than the material which forms the substrate 104. Suitable materials for the hardface 102 are described, for example, in U.S. Pat. No. , 4,836,307 issued to Keshavan et al, although other hardfacing materials known in the art may be used for the hardface overlay 102. The hardface overlay 102 may be applied by manual arc welding, plasma transferred arc welding or other process known in the art.

In this embodiment of the invention, it is preferable to use a controlled-pulse, pulsed transferred arc technique and system such as described in co-pending U.S. patent application Ser. No. 09/153,130 filed on Sep. 15, 1998 entitled, "Pulsed Plasma Transferred Arc System", and assigned to the assignee of this invention. An advantage which may be offered by using the system disclosed in the Ser. No. 09/153,130 application is relatively precise control over the thickness of the hardface overlay 102 as applied at any position on surface of the substrate 104. Generally speaking, the technique disclosed in the Ser. No. 09/153,130 application includes pulsed plasma transferred arc welding of hardface onto the substrate, wherein the welding current is varied from a lower value at least enough to melt one component of the hardface material to a high value selected to avoid the formation of weld pools in the weld area. The thickness of the hardface material thus applied can be controlled by selecting the values for the weld current, or preferably, by adjusting the flow rate of the hardface powder through the welding apparatus and selecting corresponding welding current values for the powder flow rate.

Although any apparatus adapted to apply hardfacing can be used in this embodiment of the invention, it is also preferable to use a system disclosed in co-pending U.S. patent application Ser. No. 09/153,676 filed on Sep. 15, 1998 entitled, "Automated Hardfacing System" and assigned to the assignee of this invention. The system disclosed in the Ser. No. 09/153,676 patent application includes a computer-controlled robotic arm for positioning a plasma transferred arc welding apparatus. By using the system disclosed in the Ser. No. 09/153,676 patent, the position of the welding apparatus with respect to each tooth having hardfacing applied thereon can be precisely controlled, and control over the position is highly repeatable as each successive tooth substrate has hardface overlay applied thereto. By precise control of the welding apparatus position and control of the hardface powder flow rate and corresponding welding current, a predetermined thickness of hardfacing can be applied at any selected position on the exterior surface of the tooth 100.

In this particular embodiment of the invention, the hardface overlay 102 is applied so that the thickness of the hardface overlay 102 on at least one of the flanks 104A, 104B increases nearer to the crest 104C of the substrate 104, and decreases near the root end of that flank 104A, 104B. Preferably both flanks 104A, 104B will include a tapered thickness for the overlay 102 as just described. Consistent with the previously explained technique for controlling overlay thickness when using plasma transferred arc welding to apply the hardface overlay 102, the powder flow rate can be increased when the welding apparatus is applying hardfacing near the crest 104C of the substrate 104, and the powder flow rate can be correspondingly reduced when the welding apparatus is applying hardfacing to the areas near the roots of the flanks 104A, 104B. This structure of variable thickness for the hardface 102 enables the leading edge 102A and trailing edge 102B of the hardface 102 to subtend an angle, α, with respect to horizontal which is greater than the angle, β, subtended by the flanks 104A, 104B of the substrate 104 with respect to horizontal. The angle with respect to horizontal subtended by edges 102A and 102B can be in the range of about 40 to 65 degrees where the flanks 104A 104B subtend the angles as previously explained of about 35 to 55 degrees. As is known in the art, having leading and trailing edges on a bit tooth which subtend a relatively high angle can improve the penetrating and cutting power of the tooth as it is impressed upon earth formations. Although ranges of subtended angles have been suggested for the flanks 104A, 104B and the edges 102A, 102B, in this embodiment, it is desirable that angle β be selected to provide the tooth 100 with relatively high strength, and the angle a be selected to provide the tooth 100 with relatively high penetration and cutting capability. It is not necessary for the subtended angle of each flank 104A, 104B to be the same as the angle subtended by the other flank. Similarly, there is no need for each edge 102A, 102B to subtend the same angle as the other edge. Symmetric edges and flanks are therefore not to be construed as a limitation on the invention.

An advantage which may result from making teeth according to this embodiment of the invention includes an increase in the debris clearance between adjacent teeth. As shown in FIG. 6, a clearance area A between adjacent teeth 100 is increased by an amount approximated by triangular sections b and c as compared to prior art hardface techniques wherein the hardface would extend into the areas shown at b and c. For the typical spacings between adjacent teeth in milled-tooth rock bits, this embodiment of the invention can provide about 15 percent increase in debris clearance between adjacent teeth.

Other embodiments of the invention are shown in FIGS. 7, 8 and 9. FIG. 7 shows one example of a so-called "self-sharpening" bit tooth wherein a specially formed "cap" 106 has a shape designed to compensate for wear of the hardface during use of the bit. Other cap shapes are shown at 108 in FIG. 8 and 110 in FIG. 9. The self-sharpening teeth shown in FIGS. 7, 8 and 9 may include the feature of the first embodiment of the invention wherein the thickness of the hardface is tapered at the root ends of the substrate, and generally thickens at the crest of the substrate. Alternatively, the self-sharpening teeth shown in FIGS. 7, 8 and 9 may have substantially constant thickness along the flanks of the substrate, wherein the shape of the cap is formed by the method described previously for changing the thickness of the applied hardface material.

Additionally, embodiments are shown in FIGS. 10–17, wherein multiple layers of hardface material are applied to the substrate to compensate for wear of the hardface during use of the bit. FIGS. 10 and 11 show examples of a cap formed on the substrate by applying a sub-layer 112 of hardface material to the crests prior to the application of a top layer 114 to produce bit teeth having thicker hardfacing overlay on the crests. Each layer of hardface applied to the substrate may be formed by the method described previously so as to have a selectable thickness. Additionally, a sharp leading edge may be formed on the teeth by adding a weld bead, for example, on the crests, on the leading edge at an angle, or below the leading edge on flanks, as shown in FIGS. 12.

Figure 17:
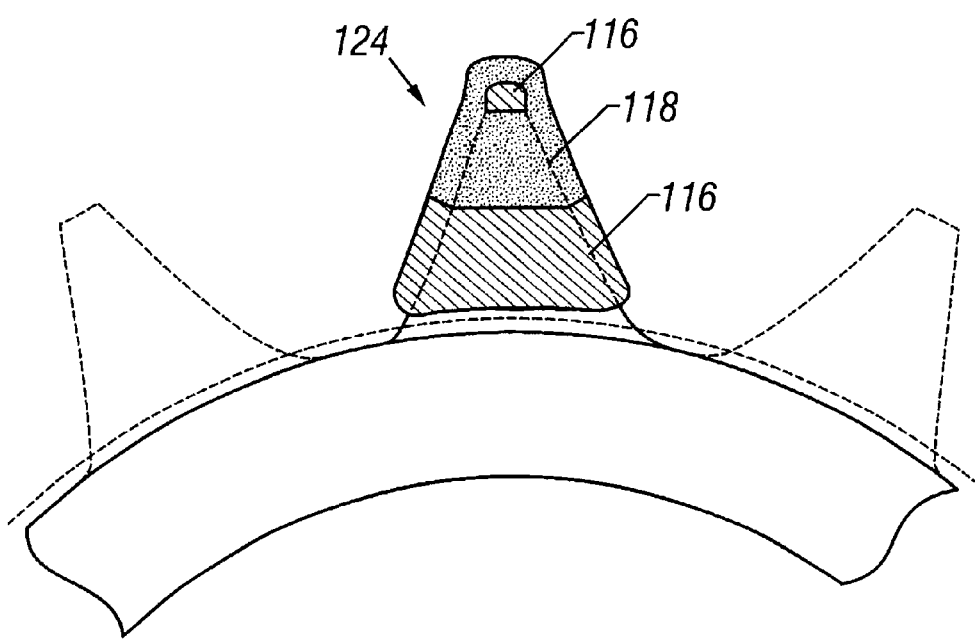

In the embodiments of FIGS. 10 and 11, the sub-layer 112 and top-layer 114 comprise the same hardface material. Alternatively, the layers of hardface applied to the substrate may comprise different materials, as shown in FIG. 13. In this embodiment, the sub-layer may comprise a more ductile material 116 and the top-layer may comprise a harder material 118 so that the total thickness of the hardface overlay can be increased while maintaining ductility. Providing a transition layer between the soft substrate and the exterior hardface also results in lower stress and thermal gradients between mating material surfaces. Other examples are shown at 120A and 120B in FIG. 14 and in FIGS. 15 and 16. Alternatively, multiple layers of hardface may be applied to the substrate as shown at 120C in FIG. 14, wherein a more ductile hardface material 116 is applied on the substrate and a harder (more brittle) material 118 is applied on the "crown" and flank of the tooth. This embodiment provides a hard crown surface for cutting and softer, yet erosion resistant, flanks giving ductility to the entire tooth. Alternatively, multiple layers of hardface can be applied as shown in FIG. 17, wherein a more ductile hardface material 116 is applied to the crest and the lower section of the flanks and a harder hardfacing material 118 is applied to the crown and the upper section of the flanks of the tooth. This embodiment provides a hard upper tooth surface for cutting while giving ductility to the tooth. The teeth shown in FIGS. 10–17 may include the feature of the first embodiment of the invention, wherein the thickness of the hardface is tapered at the root ends of the substrate, and generally thickens at the crests of the substrate. Alternatively, the teeth shown in FIGS. 10–16 may have substantially constant thickness along the flanks of the substrate. Multiple layers of hardface may be applied to achieve a desired external surface configuration. A particular advantage of the invention is that the substrate can have a substantially regular exterior surface, while the hardface overlay can have practically any selected exterior surface configuration. The selected exterior surface configuration can provide increased drilling performance and/or improved wear resistance to a bit made according to the invention while reducing the complexity of the process used to form the substrate. Prior art drill bit teeth, such as those describe in the Background section herein, for example, provided selected thicknesses of hardfacing by forming specialized shapes to the substrate exterior surface. Using the method of this invention, it is not necessary to form the substrate to such specialized shapes, but instead the substrate may be formed to improve its overall strength.

To summarize the invention with respect to the embodiments described herein, generally the invention provides a method for applying hardface to a substrate structure wherein the external surface configuration of the hardface is selectable by applying hardface on the substrate so as to have a selectable thickness related to the position along the external surface of the substrate. Prior art hardface methods provided only a uniform exterior surface, or a uniform thickness of the hardface overlay.

Other embodiments of the invention can be readily devised by those skilled in the art which do not depart from the spirit of the invention as disclosed herein. Accordingly, the scope of the invention shall be limited only by the attached claims.

What is claimed is:

1. A method for applying hardfacing to teeth on a drill bit comprising:

applying said hardfacing to at least one of said teeth so as to have a thickness selected to correspond to a position about an exterior surface of said at least one of said teeth, wherein said thickness generally, steadily increases as said position changes from a root end to a crest end of at least one flank of said at least one of said teeth, said at least one of said teeth having a substantially regular exterior substrate surface.

2. The method as defined in claim 1 wherein said thickness is increased proximal to a crest of said at least one tooth so as to form a self sharpening cap thereon.

3. The method as defined in claim 1 wherein said hardfacing is applied by plasma transferred arc welding.

4. The method as defined in claim 3, wherein a flow rate of powdered hardfacing material is adjusted to correspond to a selected value of said thickness.

5. The method as defined in claim 4, wherein a welding current is adjusted to correspond to said flow rate.

6. The method as defined in claim 1 wherein an angle subtended by flanks of said at least one tooth is selected to provide increased strength to said at least one tooth and said hardfacing is applied to said at least one tooth to cause exterior surfaces of said hardfacing corresponding to said flanks to subtend an angle selected to provide increased penetration of said tooth through earth formations while drilling.

7. The method as defined in claim 1 wherein said hardfacing is applied in multiple layers.

8. The method as defined in claim 7 therein at least one of said multiple layers comprises a more ductile hardface material than at least one other of said multiple layers.

9. The method as defined in claim 7 wherein the multiple layers comprise at least one bead.

10. The method as defined in claim 9 wherein the at least one bead is applied on at least one of the crest, a leading edge and a flank of the at least one tooth.

11. The method as defined in claim 1 wherein said selected thickness is greater on a leading edge of said teeth than on a trailing edge of said teeth.

12. A drill bit cutting element, comprising:

a substrate; and a hardface overlay applied to an exterior of said substrate, wherein a thickness of said hardface overlay is selected to correspond to a position about the exterior surface of said substrate, wherein said thickness generally, steadily increases as said position changes from a root end to a crest end of at least one flank of said cutting element, said substrate having a substantially regular exterior surface.

13. The cutting element as defined in claim 12 wherein said thickness is increased proximal to a crest of said cutting element so as to form a self-sharpening cap thereon.

14. The cutting element as defined in claim 12 wherein said hardfacing is applied by plasma transferred arc welding.

15. The cutting element as defined in claim 14 wherein a flow rate of powdered hardfacing material is adjusted to correspond to a selected value of said thickness.

16. The cutting element as defined in claim 15 wherein a welding current is adjusted to correspond to said flow rate.

17. The cutting element as defined in claim 12 wherein an angle subtended by flanks of said cutting element is selected to provide increased strength to said cutting element and said hardface overlay is applied to said cutting element in varying thickness so that exterior surfaces of said hardface overlay corresponding to said flanks subtend an angle selected to provide increased penetration of said cutting element through earth formations while drilling.

18. The cutting element as defined in claim 12 wherein said hardface overlay comprises multiple layers.

19. The cutting element as defined in claim 18 wherein at least one of said multiple layers comprises a more ductile hardface material than at least one other of said multiple layers.

20. The cutting element as defined in claim 18 wherein the multiple layers comprise at least one bead.

21. The cutting element as defined in claim 20 wherein the at least one bead is applied on at least one of the crest, a leading edge and a flank of the at least one tooth.

22. The cutting element as defined in claim 12 wherein said thickness is greater on a leading edge of said cutting element than on a trailing edge thereof.

23. A method for applying hardfacing to a substrate, comprising:

selecting a desired exterior surface configuration of said hardfacing; and applying said hardfacing to said substrate at each position along an exterior surface of said substrate to a thickness corresponding to a distance between said exterior surface configuration and said exterior surface of said substrate at each said position and wherein said thickness generally, steadily increases as said position changes from a root end to a crest end of at least one flank of said substrate, said substrate having a substantially regular exterior surface.

24. The method as defined in claim 23 wherein said substrate comprises a drill bit tooth and said thickness is increased proximal to a crest of said tooth so as to form a self sharpening cap thereon.

25. The method as defined in claim 23 wherein said hardfacing is applied by plasma transferred arc welding.

26. The method as defined in claim 25 wherein a flow rate of powdered hardfacing material is adjusted to correspond to a selected value of said thickness.

27. The method as defined in claim 26 wherein a welding current is adjusted to correspond to said flow rate.

28. The method as defined in claim 23 wherein said substrate comprises a drill bit tooth and an angle subtended by flanks of said tooth is selected to provide increased strength to said tooth during drilling therewith, and said hardfacing is applied to said tooth to cause exterior surfaces of said hardfacing corresponding to said flanks to subtend an angle selected to provide increased penetration of said tooth through earth formations while drilling therewith.

29. The method as defined in claim 23 wherein said hardfacing is applied in multiple layers.

30. The method as defined in claim 29 wherein at least one of said multiple layers comprises a more ductile hardface material than at least one other of said multiple layers.

31. The method as defined in claim 29 wherein the multiple layers comprise at least one bead applied to said substrate.

32. The method as defined in claim 23 wherein said substrate comprises a tooth and said thickness is greater on a leading edge of said tooth than on a trailing edge of said tooth.

33. The method as defined in claim 23 wherein said substrate comprises a drill bit tooth.

34. The method gas defined in claim 33 wherein said hardfacing is applied in multiple layers.

35. The method as defined in claim 34 wherein the multiple layers comprise at least one bead.

36. The method as defined in claim 35 wherein the at least one bead is applied on at least one of the crest, a leading edge, and at least one flank of said teeth.

* * * * *